May 24, 1955   L. M. MILLER   2,709,215
DOMESTIC APPLIANCE
Filed Dec. 14, 1953   3 Sheets-Sheet 1

INVENTOR.
Lester M. Miller
BY R R Candor
His Attorney

May 24, 1955
L. M. MILLER
2,709,215
DOMESTIC APPLIANCE
Filed Dec. 14, 1953
3 Sheets-Sheet 2
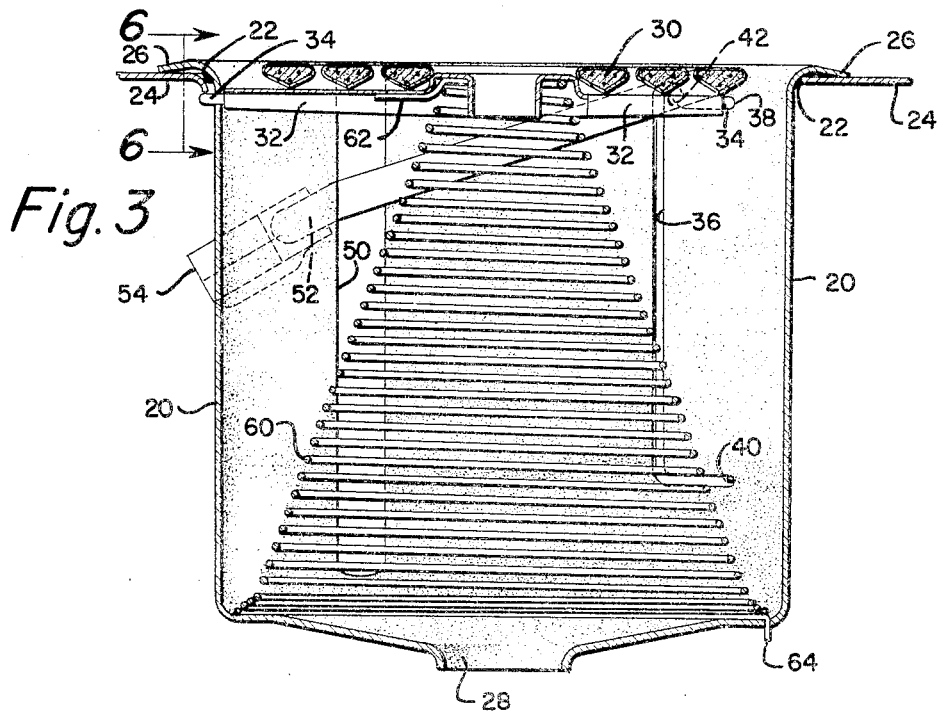
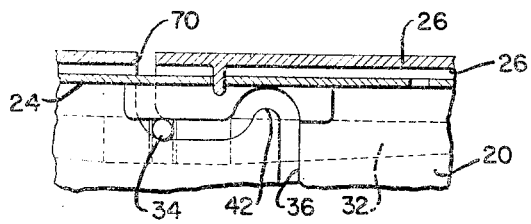
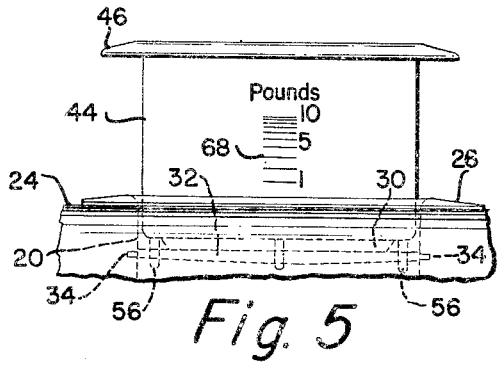
INVENTOR.
Lester M. Miller
BY
His Attorney

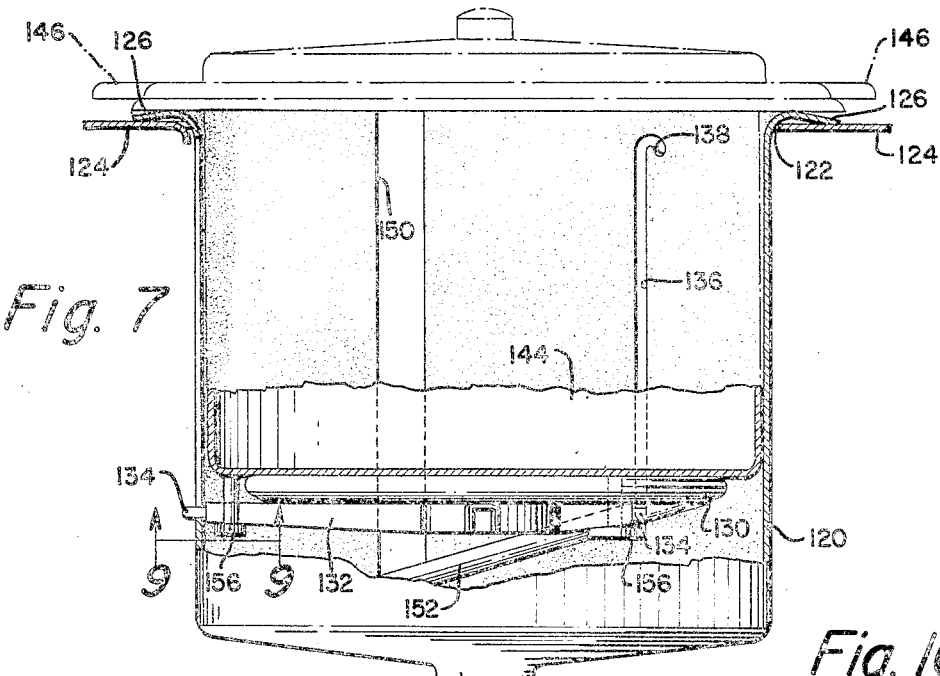
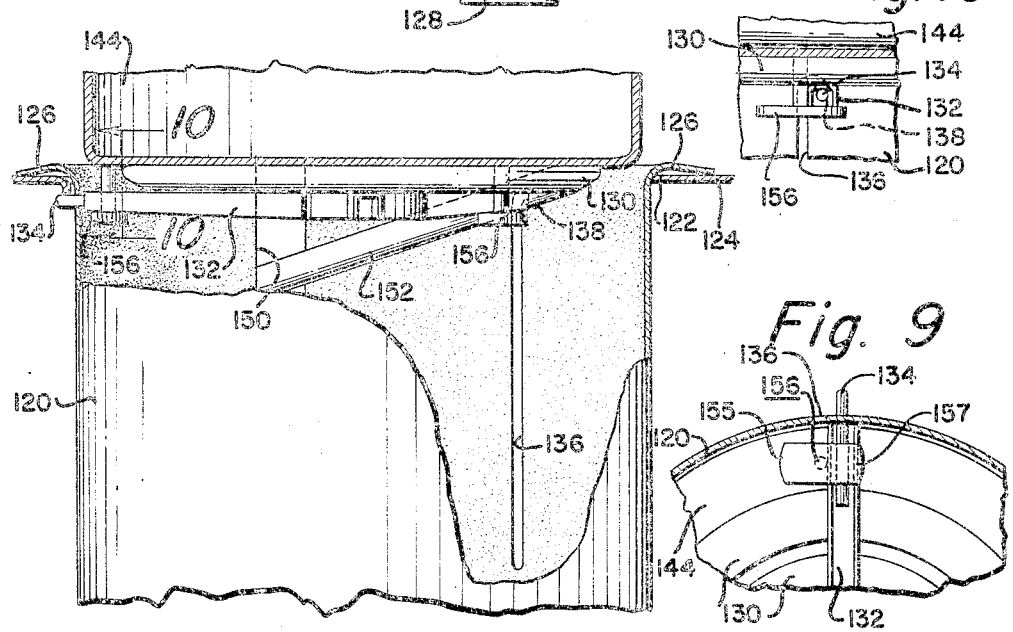

United States Patent Office 2,709,215
Patented May 24, 1955

2,709,215

DOMESTIC APPLIANCE

Lester M. Miller, Dayton, Ohio, assignor to General Motors Corporation, Detroit, Mich., a corporation of Delaware Application December 14, 1953, Serial No. 397,887

4 Claims. (Cl. 219—43)

This invention relates to a domestic appliance and more particularly to deep well cooking arrangements.

Many electric ranges provide deep well cooking arrangements convertible into a surface heater by lifting the heater to an upper support. This is ordinarily difficult if not impossible to do if the well is still hot from just being used.

It is an object of my invention to provide an arrangement in which the deep well can be converted into a surface heater and vice versa regardless of the temperature of the well and the heater.

It is another object of my invention to provide an arrangement by which a container may be used to convert a deep well cooker into a surface heater and vice versa.

It is another object of my invention to provide an arrangement by which a deep well cooker can be used as a simple weighing scale.

These and other objects are attained in the form shown in the drawings by providing a container adapted to fit in a deep well cooker with T-shaped feet which when placed upon the surface heater project between or outside the heater coils sufficiently far to engage and hook the supporting arms of the heater. The heater is preferably provided with supporting arrangements at different levels and guiding means between the various supporting arrangements.

If desired the surface heater may be projected and turned by a suitable coil spring which will tend to turn so as to engage the supporting slot portions. The container may be provided with a scale graduated according to the deflection of the spring when different weights are placed within the container.

Further objects and advantages of the present invention will be apparent from the following description, reference being had to the accompanying drawings wherein a preferred form of the invention is clearly shown.

In the drawings:

Figure 3 is a sectional view similar to Figure 1 with the heater shown in its upper position;

Figure 4 is a view showing the container with the hooks used as supporting feet for the container;

Figure 5 shows the container and well being used as a simple scale;

Figure 6 is a fragmentary sectional view taken along the line 6—6;

Figure 7 is a vertical sectional view of a modified form of a cooker embodying another form of my invention;

Figure 8 is a vertical sectional view similar to Figure 7 but with the surface heater and container shown in the upper position;

Figure 9 is a fragmentary sectional view taken along the line 9—9 of Figure 7; and Figure 10 is a fragmentary sectional view taken along the line 10—10 of Figure 8.

Figure 1:
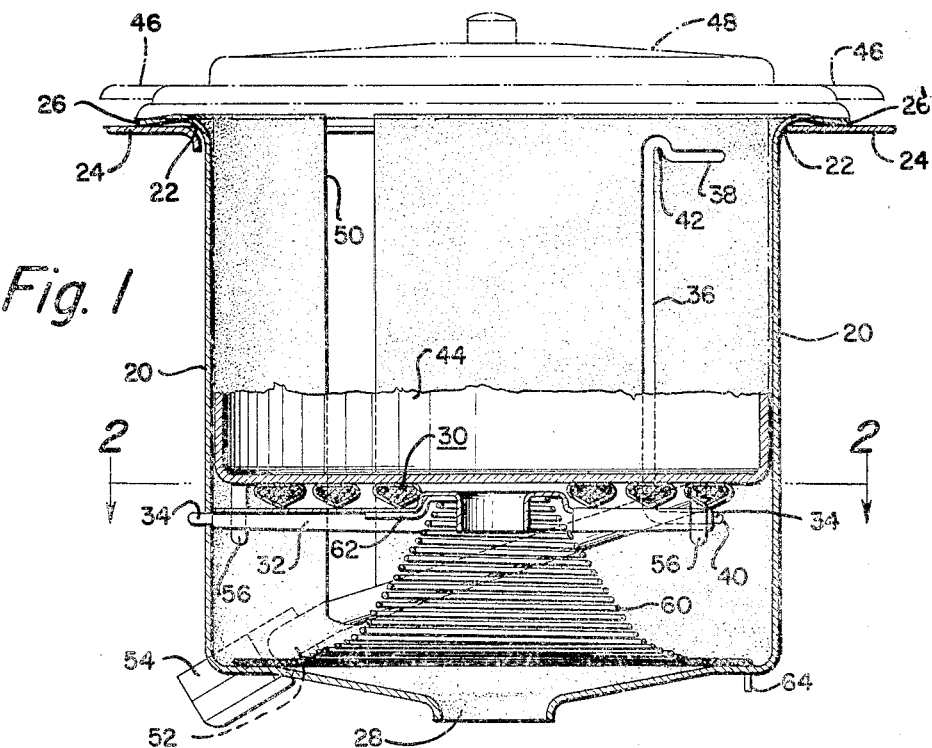
Figure 1 is a vertical sectional view of a deep well cooker embodying one form of my invention taken substantially along the line 1—1 of Figure 2 with the heater shown in its lower position.
Figure 2:
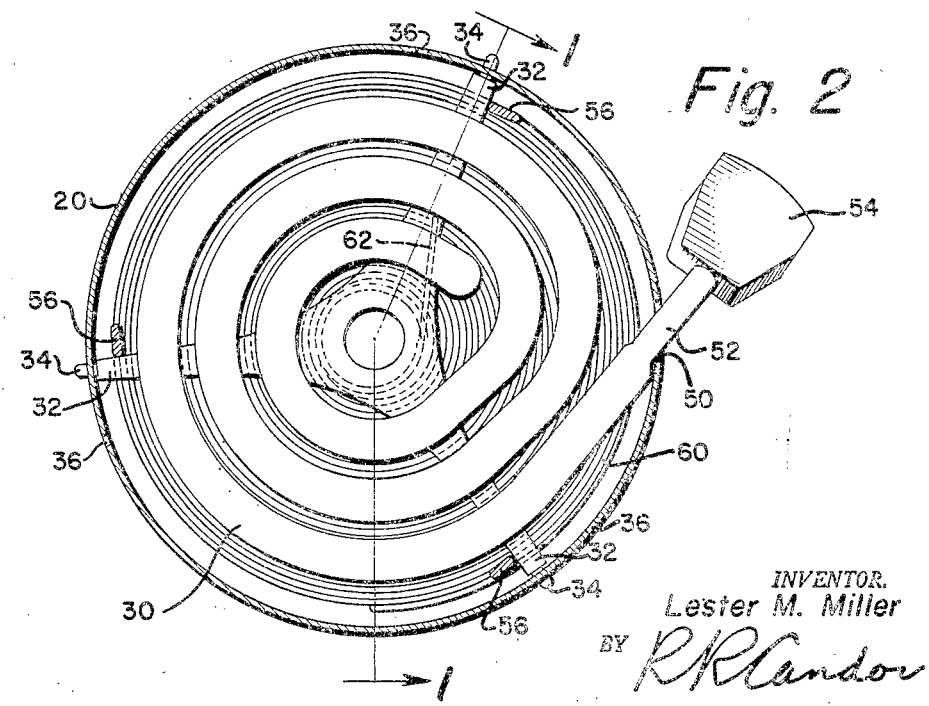
Figure 2 is a sectional view taken substantially along the line 2—2 of Figure 1.

Referring now to the drawings and more particularly to Figure 1 there is shown a deep well 20 set within an aperture 22 in the range top 24 of an electric range. The deep well 20 is substantially cylindrical in shape and has a flange 26 overlapping the edges of the aperture 22 at its upper end and a centrally located drip outlet 28 in its bottom. Located in Figure 1 within the lower portion of the deep well 20 there is provided a surface heating unit 30 which is in the form of a spiral tubular sheath electric surface heater. It is supported upon a three-armed support 32. Each of the arms of the support 32 is provided with a pin-shaped projection 34 extending through a slot 36 in the adjacent vertical wall of the well 20. The slot 36 at its upper and lower ends extends into laterally extending supporting portions 38 and 40. These two portions may be connected by either a straight or a curved slot which may have, if desired, additional lateral supporting portions. The upper slot 38 has a hump 42 between it and the vertical portion of the slot 36 to prevent the accidental movement of the projecting pins 34 from the portion 38 into the vertical portion of the slot 36.

In the lower position of the surface heater 30 the deep well 20 is adapted to be used with a cylindrical container 44. This container 44 is preferably provided with a flange 46 which extends over the flange 26 and is so shaped that it can be readily gripped. This container as is conventional may be provided with a suitable lid 48. As shown in Figure 3 the surface heater 30 may also be used in its uppermost position in which the support 32 has its projecting pins 34 in engagement with the upper slot portions 38. The flange 26 serves as the conventional rim for the surface heating unit 30 so that it is similar to the other surface heaters of an electric range. The well 20 is provided with an additional slot 50 through which projects the end portion 52 of the heating unit 30. This end portion 52 is provided with an electrically insulated connector 54 adapted to connect through flexible electrical conductors with a suitable power source.

When used these surface heaters 30 remain hot for a considerable period of time after being used. Ordinarily they are too hot to handle immediately after being used. According to my invention the bottom of my container 44 is provided with projections 56 which are three in number which are equally spaced as are the three supporting arms of the heater support 32. These projections 56 project down far enough so that their laterally extending portions will extend beneath the arms of the support 32. The projections 56 are located outside of the confines of the surface heater 30 so that they interfere in no way with the ordinary use of the heater. These projections 56 however may be used to turn the support 32 so as to move the pins 34 out of either of the laterally extending slot portions 38 or 40. By this arrangement, even though the container 44 may be hot it may be turned by the use of hot pads so as to turn the support 32.

A conical coil spring 60 or a cylindrical coil spring extends between the support 32 and the bottom of the well 20. This coil spring has sufficient upward force to lift the surface heater 30 from the position shown in Figure 1 to the position shown in Figure 3. Preferably the spring is provided with a torsion arm 62 at its upper end which extends into and is held by one of the arms of the support 32.

The lower end of the spring 60 is held torsionally by having an end portion 64 extend through an aperture in the bottom of the deep well 20. The spring 60 is wound torsionally a sufficient amount so as to apply a turning movement between the support 32 and the deep well 20 which is sufficient to move the pins 34 in the direction of and into the laterally extending slot portions 38 and 40. To move the surface heater 30, the container 44 is rotated in the opposite direction out of either the slot portion 38 or 40 and moved upwardly by the spring 60 or downwardly by pressing downwardly upon the container 44 to raise or lower the heater 40. The spring 60 by its torsional action will automatically move the pins 34 into the laterally extending slot portions 38 and 40 when they are reached.

As shown in Figure 4 the projections 56 upon the container 44 serve a useful purpose acting as legs to keep the hot bottom surface away from any surface upon which it may be set. In this way such a surface will not be scorched. This container may be provided with internal graduations 66 providing a liquid measure scale. This container 44 is also preferably provided with an external scale 68 in calibrated terms of the weight of the contents of the container 44 so that the container and spring arrangement may be used as a simple scale for weighing the contents of the container 44. The scale 68 cooperates with the flange 24 to give a visible indication of the weight of the contents of the container 44 as shown in Figure 5.

In Figure 6 there is shown an exit slot portion 70 in the flange 26 of the deep well 20. This may be used to remove the support 32 from the well 20. The heating unit 30 need not be fastened to the support 32 but if it is fastened to the support 32 the slot 50 must be made wide enough to permit the axial movement of the surface heater 30 sufficient to permit the pins 34 to move in the slots 38 and 40.

In Figures 7 to 10 there is shown a modified form of my invention in which the well 120 is provided with a flange 126 resting upon the edges of the aperture 122 of the range top 124. The well is provided with an aperture 128 in its bottom portion. The well is provided with a slot 150 for the end portion 152 of the surface heater 130. The surface heater 130 is supported by the three-armed support 132 having pins 134 projecting into three identical slots 136 in the walls of the well 120. The slots 136 as well as the pins 134 are preferably 120° apart. The slots 136 conveniently are vertical but they may be placed at an angle or be curved if desired. The top of the slot 36 is provided with a hump and laterally extending portion 138. The pins 134 are adapted to rest in the end of this slot portion 138 as shown in Figure 8 to hold the support 132 and the heater 130 in the upper position as shown in Figure 8. As shown in Figure 7 the deep well 120 is adapted to contain a container 144 which may be provided with a gripping flange or handles 146 which extend over the flange 126.

According to my invention the bottom of the container 144 is provided with three T-shaped feet 156 spaced apart the same amount as the three arms of the support 132 and sufficiently near the cylindrical wall of the container 144 as to be outside of the surface heater 130. These feet 156 are sufficiently long that their laterally extending portions 155 and 157 will just extend beneath the adjacent arms of the support 132 as shown in Figures 7 and 8. With this arrangement without the use of the spring 60, the handles 146 on the flange of the container 144 may be gripped and turned in either direction until either of the projecting portions 155 and 157 extend beneath the arms of the support 132. In the upper position, the handles 146 must be lifted and turned until the pins 134 are lifted over the hump 138. The support 132 may then be moved vertically in the vertical portion of the slot 136 to the alternate position. In the lower position of the heater 130, the pins 134 merely rest in the lower ends of their respective slots 136. In the upper position the pins 134 in the extremely upper end position of the slot 136 are beyond the hump 138. This makes it necessary that the support 132 be lifted up to the top of the slot 136 and then turned clockwise slightly until the pin 134 is lifted over the hump 138 and then dropped into the end of the slot. To lower the slot 132 and the heater 130 the handles 146 are both lifted and turned at the same time until the pins are moved over the hump 138 and then the container 144, the heater 130 and the support 132 may be dropped until the pins 134 reach the lower ends of the slots 136.

In either form to move the surface heater it is not necessary to grasp the surface heater or even to place the hands within the well. If the container is hot, hot pads may be used to grasp the handles 146 or 46 to turn the container to accomplish the change in position.

While the form of embodiment of the invention as herein disclosed constitutes a preferred form, it is to be understood that other forms might be adopted as may come within the scope of the claims which follow.

What is claimed is as follows:

1. A deep well cooking arrangement including a deep well, a surface heater for the well, said surface heater having a plurality of radially extending support arms, multiple support means within the well cooperating with said support arms for supporting said heater at a plurality of different levels within the well, and a removable liquid holding cooking container shaped to fit within said deep well and to rest upon in good surface contact with said surface heater, said container being provided with a plurality of supporting feet extending beneath its bottom surface, said feet having lifting hooks for engaging and lifting said supporting arms.

2. A deep well cooking arrangement including a deep well, a surface heater for the well, said well being provided with guide means extending from one position to another, said surface heater being provided with means interengaging said guide means, spring means exerting an upward thrust upon said surface heater, said guide means being provided with lateral supporting portions at a plurality of different levels, said spring means being connected between said interengaging means and said well and being provided with torsion characteristics for exerting a torque upon said interengaging means in a direction for urging said interengaging means into said lateral supporting portions.

3. A deep well cooking arrangement including a deep well, a surface heater for the well, said well being provided with guide means extending from one position to another, said surface heater being provided with means interengaging said guide means, spring means exerting an upward thrust upon said surface heater, said guide means being provided with lateral supporting portions at a plurality of different levels, said spring means being connected between said interengaging means and said well and being provided with torsion characteristics for exerting a torque upon said interengaging means in a direction for urging said interengaging means into said lateral supporting portions, and a container adapted to rest upon said surface heater provided with a scale indicating the deflection of the spring graduated in weight for measuring the weight of the contents of the container.

4. A deep well cooking arrangement including a deep well, a surface heater for the well, said well being provided with guide means extending from one position to another, said surface heater being provided with means interengaging said guide means, spring means exerting an upward thrust upon said surface heater, said guide means being provided with lateral supporting portions at a plurality of different levels, and a removable liquid holding container adapted to fit within said deep well cooker and to rest upon said surface heater, said container being provided with a turning removable connection for removably connecting with said surface heater for moving said interengaging means out of one of said lateral supporting portions.

References Cited in the file of this patent

UNITED STATES PATENTS

| Number | Name | Date |
|---|---|---|
| 2,159,876 | Lacy | May 23, 1939 |
| 2,485,698 | Chesser | Oct. 25, 1949 |
| 2,497,258 | Chesser | Feb. 14, 1950 |
| 2,551,441 | Kuenne | May 1, 1951 |
| 2,615,118 | Kelly | Oct. 21, 1952 |